United States Patent
Park et al.

(10) Patent No.: US 10,972,022 B2
(45) Date of Patent: Apr. 6, 2021

(54) APPARATUS AND METHOD OF DIAGNOSING FAILURE OF MOTOR DRIVING SYSTEM USING OUTPUT SIGNAL OF RESOLVER

(71) Applicants: Hyundai Motor Company, Seoul (KR); Kia Motors Corporation, Seoul (KR)

(72) Inventors: Joo Young Park, Gyeonggi-do (KR); Young Un Kim, Gyeonggi-do (KR); Jae Sang Lim, Gyeonggi-do (KR); Jae Ho Hwang, Daejeon (KR); Su Hyun Bae, Daegu (KR); Yong Jae Lee, Gyeonggi-do (KR); Tae Young Chung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 2 days.

(21) Appl. No.: 16/658,990

(22) Filed: Oct. 21, 2019

(65) Prior Publication Data
US 2020/0328701 A1 Oct. 15, 2020

(30) Foreign Application Priority Data
Apr. 10, 2019 (KR) .................. 10-2019-0042055

(51) Int. Cl.
*H02P 6/12* (2006.01)
*G10L 25/18* (2013.01)
(Continued)

(52) U.S. Cl.
CPC ............... *H02P 6/12* (2013.01); *G10L 25/18* (2013.01); *G10L 25/51* (2013.01); *H02K 11/35* (2016.01); *H02K 24/00* (2013.01)

(58) Field of Classification Search
CPC ......... G10L 25/18; G10L 25/51; H02K 24/00; H02K 11/35; H02P 6/12
See application file for complete search history.

(56) References Cited

U.S. PATENT DOCUMENTS 7,336,050 B2 * 2/2008 Ihm .................. H02P 21/06
                                                    318/432
9,114,724 B2 * 8/2015 Chung .................. H02P 29/02
(Continued)

FOREIGN PATENT DOCUMENTS

KR         10-1776474         9/2017

*Primary Examiner* — Thai T Dinh
(74) *Attorney, Agent, or Firm* — Mintz Levin Cohn Ferris Glovsky and Popeo, P.C.; Peter F. Corless (57) ABSTRACT

An apparatus for diagnosing failure of a motor driving system using a resolver signal includes a resolver sensing a rotor position and a rotational frequency of a motor, a fast Fourier transform operation unit configured to perform fast Fourier transform on an output signal of the resolver to convert the output signal into frequency signals, a specific frequency band extraction unit configured to extract, from among the frequency signals, a specific frequency band including one or more frequencies selected from among a PWM switching frequency applied to an inverter, a motor's rotational frequency, and a preset resolver excitation signal frequency, and a failure diagnosing unit configured to diagnose failure by comparing a sum or a highest voltage among voltages corresponding to the frequencies included in the specific frequency band with a predetermined reference value.

15 Claims, 4 Drawing Sheets

(51) Int. Cl.
*H02K 11/35* (2016.01)
*H02K 24/00* (2006.01)
*G10L 25/51* (2013.01)

(56) References Cited

U.S. PATENT DOCUMENTS

| | | | |
|---|---|---|---|
| 9,143,065 B2 * | 9/2015 | Ajima | H02P 21/18 |
| 9,507,338 B2 * | 11/2016 | Furutani | G05B 19/404 |
| 10,816,959 B2 * | 10/2020 | Lim | H02P 21/22 |

* cited by examiner

APPARATUS AND METHOD OF DIAGNOSING FAILURE OF MOTOR DRIVING SYSTEM USING OUTPUT SIGNAL OF RESOLVER

CROSS REFERENCE TO RELATED APPLICATION

The present application claims under 35 U.S.C. § 119(a) the benefit of Korean Patent Application No. 10-2019-0042055, filed Apr. 10, 2019, the entire contents of which are incorporated by reference herein.

BACKGROUND

1. Technical Field

The disclosure relates to an apparatus and method of diagnosing failure of a motor driving system by using an output signal of a resolver.

2. Description of the Related Art

In eco-friendly vehicles such as electric vehicles (EVs), hybrid electric vehicles (HEVs), and fuel cell electric vehicles (FCEVs), which can replace conventional internal combustion vehicles, an electric motor is used as a driving source for driving the vehicle, and a motor driving system for driving the electric motor is mounted.

The motor driving system for driving the electric motor typically includes an inverter including a plurality of switching elements, an electric motor, a battery for supplying power to the inverter, and a controller.

A resolver is used to measure an absolute position of a rotor of the electric motor relative to a stator of the electric motor included in the motor driving system. Rotor information including the absolute position measured by the resolver is input to the controller so that the controller can control the motor driving system on the basis of the information.

On the other hand, the accuracy of rotor information measured by the resolver is important enough to determine an overall performance of the motor driving system. When the motor driving system malfunctions, the rotor information measured by the resolver is not accurate, resulting in difficulty in controlling the entire motor driving system. Therefore, development of a technique for diagnosing failure of the motor driving system is needed.

SUMMARY

An object of the disclosure is to provide an apparatus and method of easily diagnosing failure of a motor driving system by using an output signal of a resolver.

In order to accomplish the object of the disclosure, there is provided an apparatus for diagnosing failure of a motor driving system using a resolver signal, the apparatus including: a resolver configured to sense a position of a rotor of a motor and a rotational frequency of the motor; a fast Fourier transform operation unit configured to perform fast Fourier transform on an output signal of the resolver to convert the output signal into a plurality of frequency signals; a specific frequency band extraction unit configured to extract, from among the plurality of frequency signals, a specific frequency band including one or more specific frequencies selected from among: a pulse width modulation (PWM) switching frequency applied to an inverter that drives the motor, a rotational frequency of the motor, and a resolver excitation signal frequency; and a failure diagnosing unit configured to diagnose failure of the motor driving system by comparing a sum of voltages of the specific frequencies in the specific frequency band or a highest voltage among the voltages of the specific frequencies with a predetermined reference value.

The predetermined reference value may be a value specified in a specification of the resolver to determine failure of the motor and the inverter.

The rotational frequency of the motor may include a rotational electrical frequency and a rotational mechanical frequency, and the specific frequencies include one or more frequencies selected from among the PWM switching frequency, the rotational electrical frequency of the motor, and the rotational mechanical frequency of the motor.

The specific frequency band extraction unit may extract the specific frequency band including the PWM switching frequency and the rotational mechanical frequency of the motor, and the failure diagnosing unit may determine that failure of the inverter occurs when the sum of voltages of the PWM switching frequency and the rotational mechanical frequency of the motor, which are included within the specific frequency band, is greater than the predetermined reference value.

The specific frequency band extraction unit may extract the specific frequency band including the PWM switching frequency and the rotational mechanical frequency of the motor, and the failure diagnosing unit may determine that the failure of the inverter occurs when a maximum value of voltages of the PWM switching frequency and the rotational mechanical frequency of the motor, which are included within the specific frequency band, is greater than the predetermined reference value.

The specific frequency band extraction unit may extract the specific frequency band including the PWM switching frequency and the rotational electrical frequency of the motor, and the failure diagnosing unit may determine that failure of the motor occurs when the sum of values respectively corresponding to the PWM switching frequency and the rotational electrical frequency of the motor included in extracted specific frequency band is greater than the predetermined reference value.

The specific frequency band extraction unit may extract a specific frequency band including the PWM switching frequency and the rotational electrical frequency of the motor, and the failure diagnosing unit may determine that failure of the motor occurs when a highest value among voltages corresponding to PWM switching frequency and the rotational electrical frequencies of the motor included in the extracted specific frequency band is greater than the predetermined reference value.

The failure diagnosing may not perform diagnosing of failure when the extracted specific frequencies and the resolver excitation signal frequencies at least partially overlap.

According a further aspect of the disclosure, there is provided a method of diagnosing failure of a motor driving system using the apparatus of the disclosure, the method including: by a fast Fourier transform operation unit, transforming an output signal of a resolver that senses a rotor position and a rotational frequency of a motor into a plurality of frequency signals; by a specific frequency band extraction unit, extracting a specific frequency band including one or more specific frequencies selected from among: a pulse width modulation (PWM) switching frequency to be applied to an inverter for driving the motor, a rotational frequency of the motor, and a preset resolver excitation frequency; and by a failure diagnosing unit, diagnosing failure by comparing a predetermined reference value with a sum of voltages corresponding to the specific frequencies included in the specific frequency band or with a highest value of the voltages corresponding to the specific frequencies.

In the extracting of the specific frequency band including the specific frequencies, the specific frequency band including the PWM switching frequency and the rotational mechanical frequency of the motor may be extracted, and in the diagnosing of the failure, it may be determined that failure of the inverter has occurred when the sum of voltages corresponding to the PWM switching frequency and the rotational mechanical frequency of the motor included in the extracted specific frequency band is greater than the predetermined reference value.

In the extracting of the specific frequency band including the specific frequencies, the specific frequency band including the PWM switching frequency and the rotational mechanical frequency of the motor may be extracted, and in the diagnosing of the failure, it may be determined that a highest value among voltages corresponding to the PWM switching frequency and the rotational mechanical frequencies of the motor included in the extracted specific frequency band is greater than the predetermined reference value.

In the extracting of the specific frequency band including the specific frequencies, the specific frequency band including the PWM switching frequency and the rotational electrical frequency of the motor may be extracted, and in the diagnosing of the failure, it may be determined that failure of the motor has occurred when the sum of the PWM switching frequency and the rotational electrical frequency of the motor included the extracted specific frequency band is greater than the predetermined reference value.

In the extracting of the specific frequency band, the specific frequency band including the PWM switching frequency and the rotational electrical frequency of the motor may be extracted, and in the diagnosing of the failure, it may be determined that failure of the motor has occurred when a highest value among voltages corresponding to the PWM switching frequency and the rotational electrical frequencies of the motor included in the extracted specific frequency band is greater than the predetermined reference value.

In the diagnosing of the failure, when the extracted specific frequencies and the resolver excitation signal frequency overlap, the diagnosing of the failure may not be performed.

The predetermined reference value may be a specification value of the resolver, which is set to determine whether or not the motor or the invertor malfunctions.

According to the disclosure, it is possible to easily identify failure of a motor driving system by monitoring a resolver signal.

BREIF DESCRIPTION OF THE DRAWINGS

The above and other objects, features and other advantages of the disclosure will be more clearly understood from the following detailed description taken in conjunction with the accompanying drawings, in which.

DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an apparatus and method of diagnosing failure of a motor driving system using a resolver signal, according to an embodiment of the disclosure will be described with reference to the accompanying drawings.

Figure 1:
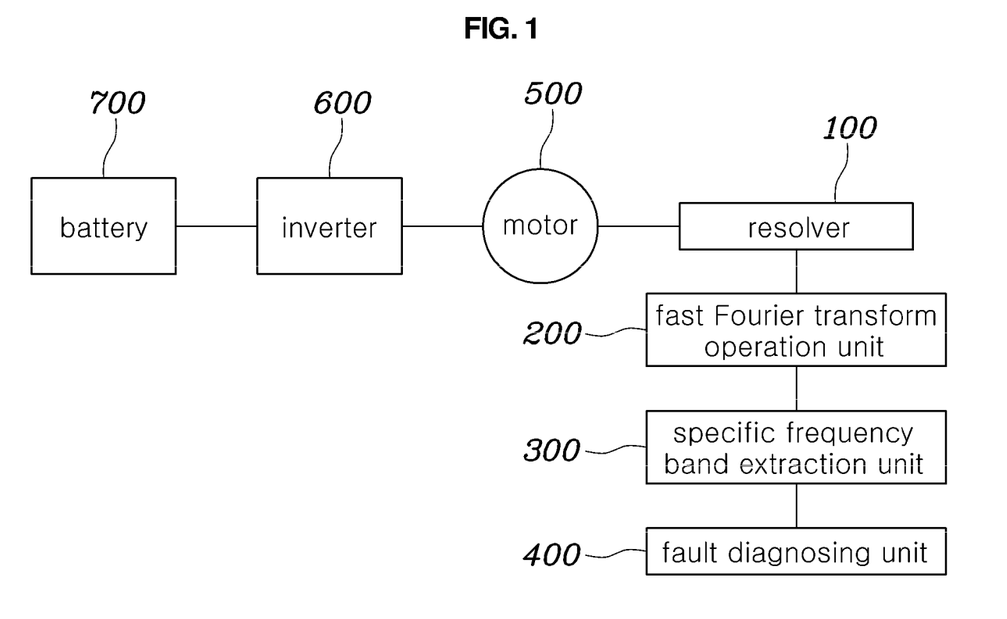
FIG. 1 is a diagram illustrating the overall construction of an apparatus for diagnosing failure of a motor driving system using an output signal of a resolver, according to one embodiment of the disclosure.
Figure 2:
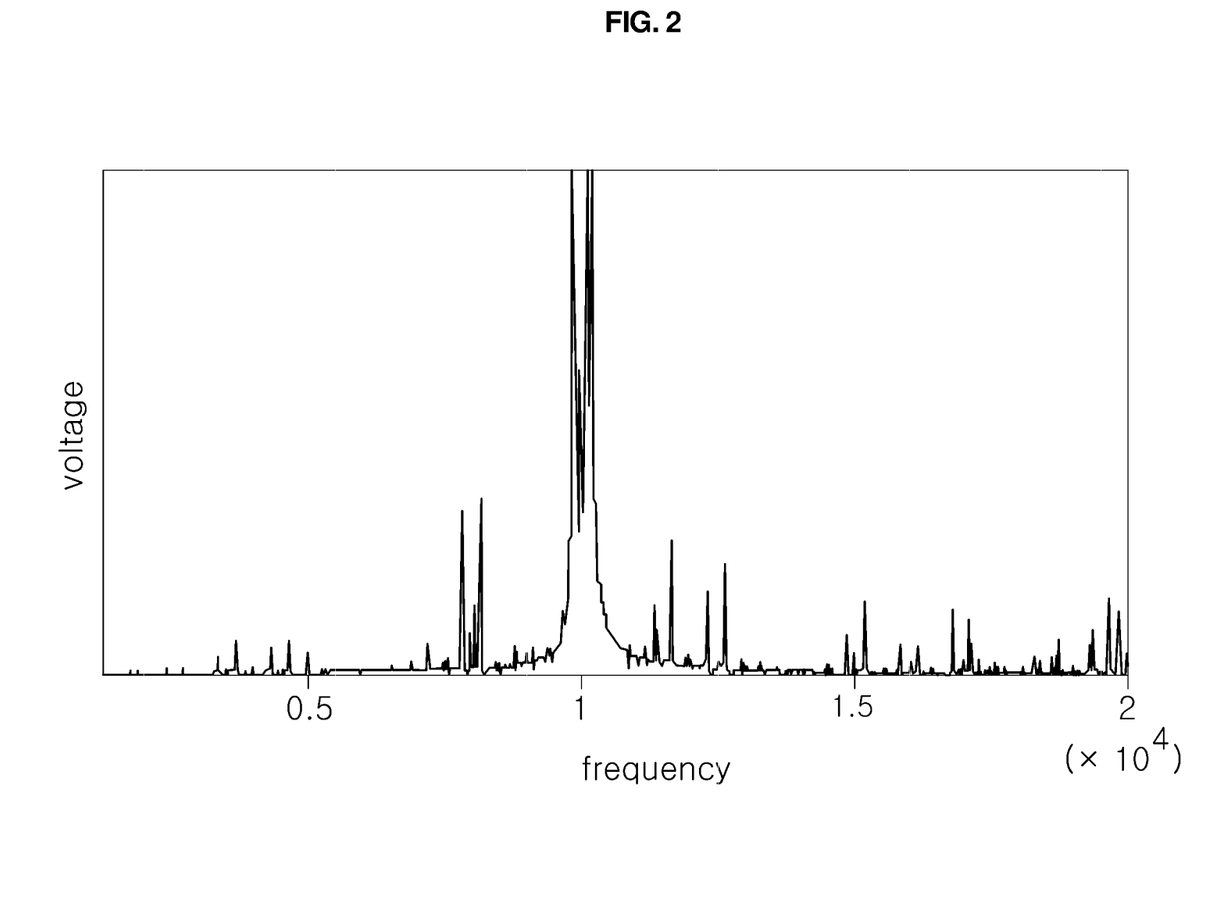
FIG. 2 is a diagram illustrating frequency signals obtained by performing fast Fourier transform (FFT) on the output signal of the resolver in the motor driving system failure diagnosing apparatus according to one embodiment of the disclosure.
Figure 3:
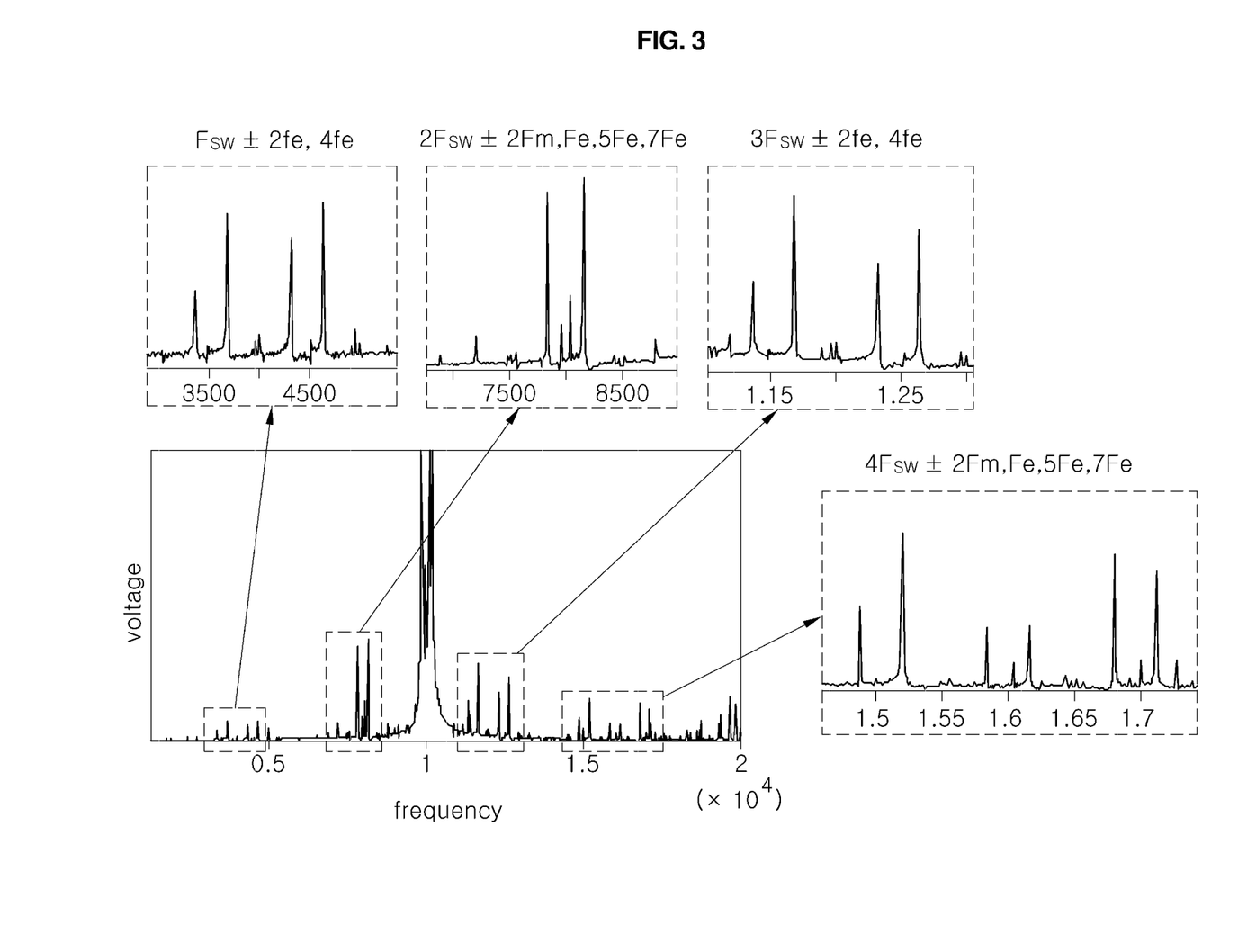
FIG. 3 is a diagram illustrating a specific frequency band including specific frequencies extracted from the plurality of frequency signals generated by the fast Fourier transform (FFT)

FIG. 1 is a diagram illustrating the overall construction of an apparatus for diagnosing failure of a motor driving system using an output signal of a resolver signal, according to one embodiment of the disclosure. FIG. 2 is a diagram illustrating a plurality of frequency signals generated by performing fast Fourier transform (FFT) on the output signal of the resolver in the motor driving system failure diagnosing apparatus according to one embodiment of the disclosure. FIG. 3 is a diagram illustrating specific frequency bands, each including a plurality of frequencies, extracted from the frequency signals generated through fast Fourier transform (FFT).

Referring to FIG. 1, an apparatus for diagnosing failure of a motor driver system using an output signal of a resolver signal, according to one embodiment of the disclosure, includes a motor 500, an inverter 600 including a plurality of switching elements and configured to drive the motor 500, a battery 700 supplying power to the inverter 600, a resolver 100, a fast Fourier transform operation unit 200, a specific frequency band extraction unit 300, and a failure diagnosing unit 400.

The resolver 100 senses the rotor position and the rotational frequency of the motor 500. The rotational frequency of the motor 500 includes a rotational electrical frequency and a rotational mechanical frequency.

In a typical environmentally-friendly automobile equipped with a motor, to control the vector of the motor, a coordinate system needs to be in synchronization with a flux position of the motor. To this end, it is necessary to read an absolute angular position of the rotor of the motor. In the disclosure, the resolver 100 is used to read the position (i.e., the absolute angular position) of the rotor of the motor 500. On the basis of the rotor position of the motor 500, which is sensed by the resolver 100, it is possible to control speed and torque of the motor 500 that drives an environmentally-friendly automobile. Since it is an existing technology that the resolver 100 senses the rotor position and the rotational frequency of the motor 500, a detailed description thereof will be omitted.

The fast Fourier transform operation unit 200 performs Fast Fourier Transform (FFT) on the output signal of the resolver 100 to convert the output signal of the resolver 100 into a plurality of frequency signals as shown in FIG. 2. Specifically, the fast Fourier transform operation of converting the output signal of the resolver 100 into frequency signals is performed because the failure diagnosing unit 400 diagnoses failure of the motor 500 and the inverter 600 on the basis of specific frequencies. Since a technique of converting the output signal of the resolver 100 into frequency signals through fast Fourier transform is an existing technology, a detailed description thereof will be omitted.

The specific frequency band extraction unit 300 extracts, from among the frequency signals generated by the fast Fourier transform operation unit 200, a specific frequency band including multiple frequencies, taking into account a pulse width modulation (PWM) switching frequency to be applied to the inverter 600, the motor rotational frequency sensed by the resolver 100, and a preset resolver excitation frequency. The specific frequency band includes the PWM switching frequency, a motor's rotational electrical frequency, a motor's mechanical frequency, or any combination the frequencies. The PWM switching frequency applied to the inverter 600 is generated by a microcomputer and the resolver excitation frequency is a present frequency at the time of circuit designing.

Referring to FIG. 3, the specific frequency band extraction unit 300 can extract a specific frequency band including specific frequencies as illustrated in each box illustrated in FIG. 3, from among a plurality of frequency signals generated by the fast Fourier transform operation unit 200 on the basis of one or more frequencies selected from among a PWM switching frequency, a motor's rotational electrical frequency, and a motor's rotational mechanical frequency.

Depending on embodiments of the disclosure, the specific frequencies included in the specific frequency band extracted by the specific frequency band extraction unit 300 vary. For example, in one embodiment, the specific frequency band extraction unit 300 extracts a specific frequency band including the PWM switching frequency and the motor's rotational mechanical frequency. In another embodiment, specific frequency band extraction unit 300 extracts a specific frequency band including the PWM switching frequency and the motor's rotational electrical frequency. In a further embodiment, the specific frequency band extraction unit 300 extracts a specific frequency band including the PWM switching frequency, the motor's rotational mechanical frequency, and the motor's rotational electrical frequency.

Referring to FIG. 3, the first and third boxes from the left side of the figure show a specific frequency band including a PWM switching frequency Fsw and a motor frequency Fe associated with a rotational electrical frequency, and the second and fourth boxes show a specific frequency band including the PWM switching frequency Fsw, a first motor frequency Fm associated with the motor's rotational mechanical frequency, and a second motor frequency Fe associated with the motor's rotational electrical frequency.

The failure diagnosing unit 400 diagnoses failure of the motor driving system by comparing a predetermined reference value with the sum of voltages corresponding to the specific frequencies included in the specific frequency band extracted by the specific frequency band extraction unit 300 or with a highest voltage among the voltages corresponding to the specific frequencies. The predetermined reference value is a value specified in the specification of the resolver 100 to determine the failure of the motor 500 or the inverter 600.

In an embodiment of the disclosure, when the specific frequency band extraction unit 300 extracts a specific frequency band including the PWM switching frequency and the motor's rotational mechanical frequency, the failure diagnosing unit 400 determines that the inverter 600 is malfunctioning when the sum of the voltages corresponding to the PWM switching frequency and the motor's rotational mechanical frequency included in the extracted specific frequency band is greater than the predetermined reference value.

In another embodiment, when the specific frequency band extraction unit 300 extracts a specific frequency band including the PWM switching frequency and the motor's rotational mechanical frequency, the failure diagnosing unit 400 determines that the inverter 600 is malfunctioning when the highest voltage among voltages corresponding to the PWM switching frequency and the motor's rotational mechanical frequencies included in the extracted specific frequency band is greater than the predetermined reference value.

In a further embodiment, when the specific frequency band extraction unit 300 extracts a specific frequency band including the PWM switching frequency and the motor's rotational electrical frequency, the failure diagnosing unit 400 determines that the motor 500 is malfunctioning when the sum of the voltages corresponding to the PWM switching frequency and the motor's rotational electrical frequency included in the extracted specific frequency band is greater than the predetermined reference value.

In a yet further embodiment, when the specific frequency band extraction unit 300 extracts a specific frequency band including the PWM switching frequency and the motor's rotational electrical frequency, the failure diagnosing unit 400 determines that the motor is malfunctioning when the highest voltage among voltages corresponding to the PWM switching frequency and the motor's rotational electrical frequencies included in the extracted specific frequency band is greater than the predetermined reference value.

Referring to FIG. 3, a method of diagnosing failure by the failure diagnosing unit 400 will be described in greater detail. As shown in the first box from the left side of FIG. 3, when a specific frequency band including frequencies Fsw−4Fe, Fsw−2Fe, Fsw+2Fe, and Fsw+4Fe, the sum of voltages corresponding to the frequencies Fsw−4Fe, Fsw−2Fe, Fsw+2Fe, and Fsw+4Fe is calculated and then compared with the predetermined reference value. When the sum is greater than the predetermined reference value, it is determined that the motor 500 is malfunctioning. On the other hand, the failure diagnosing unit 400 may compare the highest voltage among the voltages corresponding to the frequencies Fsw−4Fe, Fsw−2Fe, Fsw+2Fe, and Fsw+4Fe with the predetermined reference value and determines that the motor 500 is malfunctioning when the highest value is greater than the predetermined reference value. In the example shown in FIG. 3, since the voltage corresponding to the frequency Fsw+4Fe is the highest voltage, when the voltage of the Fsw+4Fe is greater than the predetermined reference value, the motor 500 is determined as malfunctioning. Here, Fsw denotes the PWM switching frequency, Fe denotes a frequency component associated with the motor's rotational electrical frequency.

When the frequencies extracted by the specific frequency band extraction unit 300 and the resolver excitation signal frequency overlap, preferably, the failure diagnosing unit 400 does not perform diagnosing because there is a high possibility that a wrong diagnosis is made or a diagnosis fails.

Although not illustrated in the drawings in detail, when the failure diagnosing unit 400 determines that the failure of the motor 500 or the inverter 600 has occurred, the diagnosis result is transmitted to a controller that controls the whole system. The controller displays the diagnosis result on an audio/video navigation device or a cluster computer so that the user can recognize the malfunctioning. Thus, driving safety of the vehicle is improved.

Figure 4:
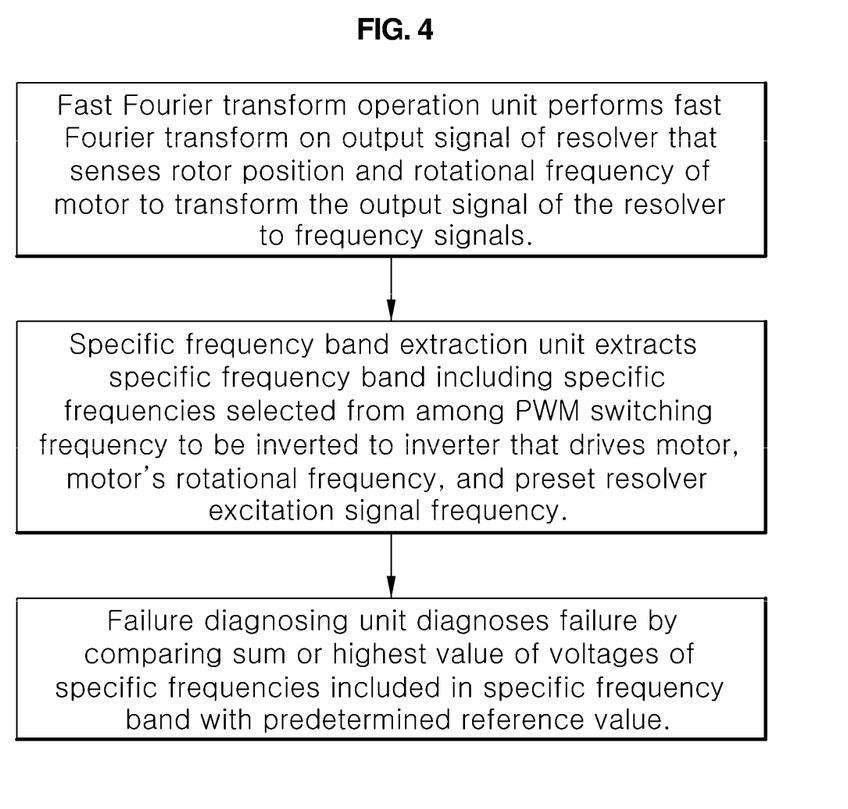
FIG. 4 is a flowchart illustrating a method of diagnosing failure of a motor driving system using an output signal of a resolver, according to an embodiment of the disclosure.

FIG. 4 is a flowchart illustrating a method of diagnosing failure of a motor driving system using a resolver signal, according to one embodiment of the disclosure. As illustrated in FIG. 4, the motor driving system failure diagnosing method using the resolver signal, according to one embodiment of the disclosure, includes: converting an output signal of a resolver, sensed by a resolver configured to sense a rotor position and a rotational frequency of a motor, into frequency signals by performing fast Fourier transform on the output signal, by using a fast Fourier transform operation unit (S100); extracting a specific frequency band including specific frequencies from the frequency signals, on the basis of a PWM switching frequency to be applied to an inverter that drives the motor, a motor's rotational frequency, and a preset resolver excitation signal frequency (S200), by using a specific frequency band extraction unit; and diagnosing failure by comparing the sum of voltages corresponding to the specific frequencies included in the specific frequency band or a highest voltage among the voltages corresponding to the specific frequencies, with a predetermined reference value, by using a failure diagnosing unit (S300).

In one embodiment, in the extracting of the specific frequency band including the specific frequencies, a specific frequency band including the PWM switching frequency and the motor's rotational mechanical frequency is extracted. In this case, in the diagnosing of the failure, the sum of voltages corresponding to the PWM switching frequency and the motor's rotational mechanical frequency included in the extracted specific frequency band is greater than the predetermined reference value, it is determined that the inverter is malfunctioning.

In the extracting of the specific frequency band, a specific frequency band including the PWM switching frequency and the motor's rotational mechanical frequency is extracted. In the diagnosing of failure, the highest voltage among the voltages corresponding to the PWM switching frequency and the motor's rotational mechanical frequencies included in the extracted specific frequency band is greater than the predetermined reference value, it is determined that the inverter is malfunctioning.

In another embodiment, in the extracting of the specific frequency band, a specific frequency band including the PWM switching frequency and the motor's rotational electrical frequency is extracted. In the diagnosing of the failure, the sum of voltages corresponding to the PWM switching frequency and the motor's rotational electrical frequency included in the extracted specific frequency band is greater than the predetermined reference value, it is determined that the motor is malfunctioning.

In the extracting of the specific frequency band including the specific frequencies, a specific frequency band including the PWM switching frequency and the motor's rotational electrical frequency is extracted, and in the diagnosing of the failure, when the highest voltage among voltages corresponding to the PWM switching frequency and the motor's rotational electrical frequencies included in the extracted specific frequency band is greater than the predetermined reference value, it is determined that the motor is malfunctioning.

The predetermined reference value is a value specified in the specification of the resolver to determine the failure of the motor or the inverter.

In the diagnosing of the failure, when the extracted specific frequency and the resolver excitation signal frequency overlap, since there is a high possibility that a wrong diagnosis is made or a diagnosis fails, it is preferable not to perform the diagnosing.

Detailed technical features in each step of the motor driving system failure diagnosing method according to one embodiment of the present are the same as those of the motor driving system failure diagnosing apparatus that is described above, a redundant description will not be given here.

What is claimed is:

1. An apparatus for diagnosing failure of a motor driving system using a resolver signal, the apparatus comprising:
    a resolver configured to sense a position of a rotor of a motor and a rotational frequency of the motor;
    a fast Fourier transform operation unit configured to perform fast Fourier transform on an output signal of the resolver to convert the output signal into a plurality of frequency signals;
    a specific frequency band extraction unit configured to extract, from among the plurality of frequency signals, a specific frequency band including one or more specific frequencies selected from among: a pulse width modulation (PWM) switching frequency applied to an inverter that drives the motor, a rotational frequency of the motor, and a resolver excitation signal frequency; and a failure diagnosing unit configured to diagnose failure of the motor driving system by comparing a sum of voltages of the specific frequencies in the specific frequency band or a highest voltage among the voltages of the specific frequencies with a predetermined reference value.

2. The apparatus according to claim 1, wherein the predetermined reference value is a value specified in a specification of the resolver to determine failure of the motor and the inverter.

3. The apparatus according to claim 1, wherein the rotational frequency of the motor includes a rotational electrical frequency and a rotational mechanical frequency, and the specific frequencies include one or more frequencies selected from among the PWM switching frequency, the rotational electrical frequency of the motor, and the rotational mechanical frequency of the motor.

4. The apparatus according to claim 3, wherein the specific frequency band extraction unit extracts the specific frequency band including the PWM switching frequency and the rotational mechanical frequency of the motor, and the failure diagnosing unit determines that failure of the inverter occurs when the sum of voltages of the PWM switching frequency and the rotational mechanical frequency of the motor, which are included within the specific frequency band, is greater than the predetermined reference value.

5. The apparatus according to claim 3, wherein the specific frequency band extraction unit extracts the specific frequency band including the PWM switching frequency and the rotational mechanical frequency of the motor, and the failure diagnosing unit determines that the failure of the inverter occurs when a maximum value of voltages of the PWM switching frequency and the rotational mechanical frequency of the motor, which are included within the specific frequency band, is greater than the predetermined reference value.

6. The apparatus according to claim 3, wherein the specific frequency band extraction unit extracts the specific frequency band including the PWM switching frequency and the rotational electrical frequency of the motor, and the failure diagnosing unit determines that failure of the motor occurs when the sum of values respectively corresponding to the PWM switching frequency and the rotational electrical frequency of the motor included in extracted specific frequency band is greater than the predetermined reference value.

7. The apparatus according to claim 3, the specific frequency band extraction unit extracts a specific frequency band including the PWM switching frequency and the rotational electrical frequency of the motor, and the failure diagnosing unit determines that failure of the motor occurs when a highest value among voltages corresponding to PWM switching frequency and the rotational electrical frequencies of the motor included in the extracted specific frequency band is greater than the predetermined reference value.

8. The apparatus according to claim 1, wherein the failure diagnosing unit does not perform diagnosing of failure when the extracted specific frequencies and the resolver excitation signal frequencies at least partially overlap.

9. A method of diagnosing failure of a motor driving system, comprising the steps of:

by a fast Fourier transform operation unit, transforming an output signal of a resolver that senses a rotor position and a rotational frequency of a motor into a plurality of frequency signals;

by a specific frequency band extraction unit, extracting a specific frequency band including one or more specific frequencies selected from among: a pulse width modulation (PWM) switching frequency to be applied to an inverter for driving the motor, a rotational frequency of the motor, and a preset resolver excitation frequency; and by a failure diagnosing unit, diagnosing failure by comparing a predetermined reference value with a sum of voltages corresponding to the specific frequencies included in the specific frequency band or with a highest value of the voltages corresponding to the specific frequencies.

10. The method according to claim 9, wherein in the extracting of the specific frequency band including the specific frequencies, the specific frequency band including the PWM switching frequency and the rotational mechanical frequency of the motor is extracted, and in the diagnosing of the failure, it is determined that failure of the inverter has occurred when the sum of voltages corresponding to the PWM switching frequency and the rotational mechanical frequency of the motor included in the extracted specific frequency band is greater than the predetermined reference value.

11. The method according to claim 9, wherein in the extracting of the specific frequency band including the specific frequencies, the specific frequency band including the PWM switching frequency and the rotational mechanical frequency of the motor is extracted, and in the diagnosing of the failure, it is determined that a highest value among voltages corresponding to the PWM switching frequency and the rotational mechanical frequencies of the motor included in the extracted specific frequency band is greater than the predetermined reference value.

12. The method according to claim 9, in the extracting of the specific frequency band including the specific frequencies, the specific frequency band including the PWM switching frequency and the rotational electrical frequency of the motor is extracted, and in the diagnosing of the failure, it is determined that failure of the motor has occurred when the sum of the PWM switching frequency and the rotational electrical frequency of the motor included the extracted specific frequency band is greater than the predetermined reference value.

13. The method according to claim 9, wherein in the extracting of the specific frequency band, the specific frequency band including the PWM switching frequency and the rotational electrical frequency of the motor is extracted, and in the diagnosing of the failure, it is determined that failure of the motor has occurred when a highest value among voltages corresponding to the PWM switching frequency and the rotational electrical frequencies of the motor included in the extracted specific frequency band is greater than the predetermined reference value.

14. The method according to claim 9, wherein in the diagnosing of the failure, when the extracted specific frequencies and the resolver excitation signal frequency overlap, the diagnosing of the failure is not performed.

15. The method according to claim 9, wherein the predetermined reference value is a specification value of the resolver, which is set to determine whether or not the motor or the invertor malfunctions.

* * * * *